3,342,770
FLUID RESISTANT SILICACEOUS COMPOSITIONS CONTAINING POLY(EPISULFIDE) AND IMPREGNATION PROCESS THEREFOR
Stephen W. Osborn, Yardley, and George F. Bulbenko, Levittown, Pa., assignors to Thiokol Chemical Corporation, Bristol, Pa., a corporation of Delaware
No Drawing. Filed May 22, 1964, Ser. No. 369,598
12 Claims. (Cl. 260—37)

The present invention relates to novel fluid resistant silicaceous materials and to a novel process for their preparation.

An object of this invention is to provide silicaceous materials which show substantial resistance to penetration by fluids.

Another object of this invention is to provide a novel process for the treatment of silicaceous materials to impart thereto substantial fluid-resistant properties.

Other objects of this invention will be inherent in or become obvious from the following explanations and examples.

It has been unexpectedly found according to the present invention, that layers of particulate and/or porous silicaceous materials which are otherwise susceptible to penetration and/or permeation by fluids, which silicaceous materials are hereinafter called "materials," may now be made substantially fluid-resistant, which is to say substantially resistant to the passage therethrough of fluids, if said materials are treated with a fluid episulfide by the process of the present invention, which provides therein a substantially fluid-resistant barrier of solid poly(episulfide) polymers.

Poly(episulfide) polymers are polymeric organic monosulfide polymers, viz, $\{R-S\}_x$, formed by the cleavage of episulfide rings on vicinal episulfide monomeric molecules, and their homo- or copolymerization, as characterized in the following equation:

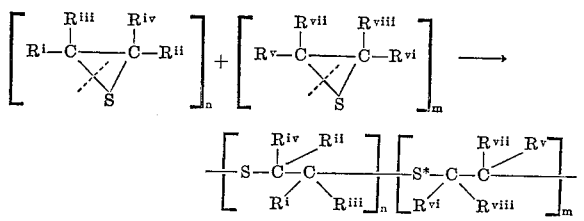

wherein the R's may be hydrogen as in ethylene episulfide, or aryl as in styrene sulfide, or alkyl as in propylene and butylene episulfides, or cycloalkyl as in cyclohexene sulfide. Therefore, by poly(episulfide) is meant, according to the present invention, a polymer formed from one or more polymerizable vicinal episulfide monomers including aryl episulfides such as styrene sulfide and alkylene sulfides such as ethylene sulfide, propylene sulfide, 1,3-butylene sulfide, 2,3-butylene sulfide, isobutylene sulfide and cyclohexene sulfide. The polymers used may be either homopolymers or interpolymers of two or more of such episulfide monomers.

Various other episulfide monomers can be copolymerized with the aforementioned monomers. Some such episulfide monomers are vicinal episulfides, such as butadiene monoepisulfide and 1,2-epoxy-3, 4-epithiobutane. Other cyclic non-vicinal episulfides having the structure:

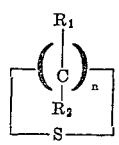

wherein $n=3$, 4, 5, or 6, and $R_1$ and $R_2$ may be heterocyclic, alicyclic, bicyclic, polycyclic and may be H, lower branched or linear alkyl groups having from 1 to 10 carbon atoms, aryl, arylalkyl and/or alkylaryl groups, such as trimethylene sulfide, pentamethylene sulfide and hexamethylene sulfide, may also be use as comonomers to the extent of about up to 20 mole percent with vicinal episulfides to prepare the solid poly(episulfide) polymers useful in the practice of this invention.

Still other comonomers may be used to a minor extent, say no more than 20 mole percent, to form with vicinal episulfides the present useful polymers. Among these useful comonomers are those having the structure:

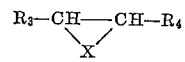

in which X is O or NH and $R_3$ and $R_4$ may be H, a lower branched or linear alkyl group having from 1 to 10 carbon atoms, an aryl, an arylalkyl and/or an alkylaryl group. $R_3$ and $R_4$ may also be heterocyclic, alicyclic, bicyclic or polycyclic, for example styrene oxide, ethylene oxide, propylene oxide, 1,2-butylene oxide, 2,3-butylene oxide, ethylene imine and propylene imine. Other polymerizable compounds like formaldehyde, trioxane, hydroxyisobutyric acid, tetrahydrofuran, 1,3-dioxane, 1,4-dioxane, trimethylene oxide, tetramethylene oxide and pentamethylene oxide are also useful as comonomers when used to the limited extent defined above. The useful polymers, whether poly(episulfide) homopolymers or interpolymers, are generally designated herein merely as "poly(episulfide) polymers." When fluid episulfide monomers and the solid poly(episulfide) polymers which are in solution are referred to in the sense of equivalent substances, they are generally designated herein as "fluid episulfides."

In general, in order to provide the necessary degree of polymerization of the episulfide monomers to provide in situ formed fluid-resistant barriers in layers of particulate and/or porous silicaceous materials, the presence of a catalyst is necessary. Any of the usual episulfide polymerization catalysts are useful in the practice of this invention, such as the Lewis acids, bases and basic salts such as magnesium and calcium oxides, etc. and the metal alkyl/active-hydrogen-bearing-cocatalyst catalyst/cocatalyst types such as diethyl zinc/water and diethyl zinc/$H_2S$. The catalyst may be normally present as a part of the particulate and/or porous silicaceous material, such as would occur in many soils where sufficient metal oxide catalysts are ordinarily already present and promote the desired degree of polymerization of episulfide monomers to provide fluid-resistant barriers in such soil. Catalyst may be added to the particulate and/or porous silicaceous materials to promote polymerization, as would be usually required with the many silicaceous materials that are normally devoid of sufficient quantities of catalysts, such as glass, in the form of beads, glass wool or glass fiber. The preferred catalysts used to form the polymers are the Lewis acid, such as $BF_3$, $PF_5$ $HClO_4$ and $H_2SO_4$. As previously indicated both alkaline and metal alkyl/cocatalyst systems may also be useful. In general, the presence of about 0.5 to 5 parts by weight of catalyst is needed per 100 parts by weight of monomers being polymerized.

The selection of the particular poly(episulfide) polymer for a particular application will depend on the type of fluid resistant properties desired in the material as well as upon the solubility properties of the polymer itself. The preferred fluid resistant poly(episulfide) polymers, used to form fluid resistant barriers in materials according to the present invention, are polymers made substantially or completely of ethylene sulfide. Other poly(episulfide) polymers, such as those made completely or substantially of propylene sulfide, and which are soluble in organic solvents can be formed as polymers outside of the material and be subsequently introduced therein in the form of polymer solutions. The propylene sulfide polymers would be used, according to the present invention, primarily to impart water resistance to the silicaceous materials treated therewith; whereas, the ethylene sulfide polymers, because of their enhanced insolubility in, and enhanced resistance to penetration by not only water, but a much larger number of fluids, would be used to provide more extensive fluid resistant properties to silicaceous materials.

These organic solvent soluble poly(episulfide) polymers, need not be removed from the polymerization medium which contains substantial quantities of organic solvent, but may be used as is to permeate the material. The solvent can then be removed by volatilization, leaving distributed within the material a substantially water resistant barrier of polymer.

As indicated above, the present novel process for treating the silicaceous materials involves introducing a solid poly(episulfide) polymer into the material in question in any of two general ways, viz:

(1) Permeating the material with a catalyst and the monomers in fluid form, such as liquids or vapors, and polymerizing the monomers to form a solid barrier in situ; or (2) Permeating the material with an organic solvent solution of the performed poly(episulfide) polymer, and removing the solvent by volatilization leaving a solid polymer barrier in the material.

The introduction of the solid polymer barrier according to the method described is generally termed herein as "treating the material with a fluid episulfide."

The materials which may be so treated according to the process of the present invention include such particulate silicaceous materials as soils which have a preponderance of silicaceous matter such as clays, etc., also sand, rock wool, asbestos, glass wool, and so forth, and such porous silicaceous materials such as concrete, ceramic tile, brick, clay tile, porcelain, and so forth.

To provide sufficient permeation of the material by the fluid episulfides where the material is relatively thick in cross section or dense, it is usually enough to penetrate the surfaces of the material to a depth of up to only a few mils, i.e., 0.1 to 5 mils.

The in situ polymerization of monomers may be conducted at temperatures of about 25° to 100° C. Depending upon the amount and type of catalyst used in situ polymerization will be essentially completed at these temperatures in intervals of from one minute to about 30 days. In general, about up to 5 parts by weight of catalyst may be added per 100 parts by weight of monomers employed.

The manner of applying the catalyst and the fluid episulfides of the material depends upon the state of aggregation, the thickness, and the density of the material. The more loosely aggregated, thinner, or more fluid permeable materials may be readily treated by either just wetting the material with the fluid episulfides, or by applying the fluid episulfides to one or more surfaces of the material by any fluid-to-material application procedures known such as roller coating, brushing, doctor blading, vapor blowing, etc. The more closely aggregated, thicker, denser, or less permeable materials may require more stringent application methods, such as by pressure impregnation.

Where preformed poly(episulfide) polymers are introduced into the material, they are in the form of solutes of organic solvent solutions. Common solvents useful in the practice of this invention, when the poly(episulfide) polymer is formed predominantly from propylene episulfide, are the aryl solvents, such as benzene and toluene, the alkanes, such as hexane and heptane, and chlorinated solvents such as carbon tetrachloride and dichloromethane.

The fluid resistant polymer barrier formed in the material, according to this invention, is not necessarily an entirely continuous film. Whatever its extent or shape in the material, however, when the barrier is provided by the process of treating the material with a fluid episulfide, as taught herein, the material is made substantially resistant to permeation or penetration by fluids, especially liquids.

The following example teaches a mode of practice of the present invention, but does not seek to define its scope.

*Example*

A water resistant barrier of poly(ethylene sulfide) was formed in a layer of sand and in a layer of diatomaceous earth (Celite) by the method of this invention.

Two portions each of dry sand and dry Celite were used to fill 10 ml. beakers to about two-thirds of their capacity. One beaker each of sand and Celite was placed on a porous grid of a vacuum dessicator, which contained in its lower chamber liquid ethylene sulfide monomer. These materials were then wetted with 3 ml. of a diethyl ether solution of 0.5% $BF_3$-etherate. The dessicator was then sealed and evacuated, after which the temperature was elevated to 40° C. for about 16 hours. The dessicator was then opened and the treated beakers were removed. Water, made slightly alkaline and colored with phenolphthalein, was then added to the brim of the beakers containing the treated and untreated samples of sand and Celite. The progress of penetration of the water down through the treated and untreated sand and Celite was observed. The water quickly penetrated completely through the entire depth of the untreated sand and Celite samples; penetration of water into the treated sand and the treated Celite samples, however, was through only the very top few millimeters of depth even after 16 to 20 hours of observation. The water was essentially contained between the top of the treated samples and the brim of the beakers.

We claim:

1. A process to provide a fluid resistant silicaceous composition comprising
    (a) treating a silicaceous material with a fluid episulfide in an amount sufficient to substantially permeate at least the surface interstices of said material with said fluid episulfide, and
    (b) converting said fluid episulfide to a solid poly(episulfide) polymer within said material to form therein a substantially fluid resistant barrier, said silicaceous material comprising a major proportion of said composition.

2. A process as in claim 12 wherein said treating comprises permeation of at least the surface interstices of a silicaceous material with a Lewis acid polymerization catalyst in fluid form and with a fluid vicinal episulfide monomer.

3. A process as in claim 2 wherein said Lewis acid polymerization catalyst is boron trifluoride in fluid form.

4. A process as in claim 2 wherein said fluid vicinal episulfide monomer is ethylene episulfide.

5. A process as in claim 1 wherein said treating comprises permeation of at least the surface interstices of a silicaceous material with at least one poly(episulfide) polymer dissolved in an organic solvent.

6. A process as in claim 5 wherein said poly(episulfide) polymer is poly(propylene episulfide).

7. A process as in claim 1 wherein said silicaceous material is a particulate silicaceous material.

8. A process as in claim 1 wherein said silicaceous material is a porous silicaceous material.

9. A process as in claim 1 wherein said converting said fluid episulfide to a solid poly(episulfide) polymer is by polymerization of a vicinal episulfide monomer.

10. A process as in claim 1 wherein said converting said fluid episulfide to a solid poly(episulfide) polymer is by removal through volatilization of the organic solvent of a poly(episulfide) polymer solution.

11. A fluid resistant silicaceous material formed by the process recited in claim 1.

12. A process as in claim 1 wherein said treating comprises permeation of at least the surface interstices of a siliceous material with a polymerization catalyst in fluid form and with a fluid vicinal episulfide monomer, said catalyst being used in an amount between 0.5 and 5 parts by weight per 100 parts by weight monomer.

References Cited

UNITED STATES PATENTS 2,810,774   10/1957   Serniuk _____ 252—429

OTHER REFERENCES

J. Furukawa and T. Saegusa, "Polymerization of Aldehydes and Oxides," Interscience Publishers, New York, 1963, pp. 405–407 relied on.

P. H. Plesch, "The Chemistry of Cationic Polymerization," Macmillan Co., New York, 1963, pp. 479, 487, 488, 497, 499, 500 relied upon.

MORRIS LIEBMAN, *Primary Examiner.*

J. E. CALLAGHAN, *Assistant Examiner.*